United States Patent [19]

Chittick

[11] 4,421,524
[45] Dec. 20, 1983

[54] METHOD FOR CONVERTING ORGANIC MATERIAL INTO FUEL

[75] Inventor: Donald E. Chittick, Newberg, Oreg.

[73] Assignee: Pyrenco, Inc., Prosser, Wash.

[21] Appl. No.: 345,787

[22] Filed: Feb. 4, 1982

Related U.S. Application Data

[63] Continuation of Ser. No. 169,400, Jul. 16, 1980, abandoned, which is a continuation of Ser. No. 18,118, Mar. 7, 1979, Pat. No. 4,268,275.

[51] Int. Cl.$^3$ .............................................. C10J 3/00
[52] U.S. Cl. ................................. 48/209; 48/197 R; 48/207; 201/22; 201/25; 252/373
[58] Field of Search ...................... 48/209, 210, 197 R, 48/207; 201/21, 25, 22, 32-34; 423/437, 644; 252/373

[56] References Cited

U.S. PATENT DOCUMENTS

| Re. 15,320 | 3/1922 | McDonald | 48/209 |
| 25,316 | 9/1859 | Breisach | 48/209 |
| 566,363 | 8/1896 | Wilkinson | 48/209 |
| 659,472 | 10/1900 | Fraser | 48/85.2 |
| 1,777,449 | 10/1930 | Rath | 48/209 |
| 4,028,068 | 6/1977 | Kiener | 48/209 |
| 4,038,152 | 7/1977 | Adkins | 48/209 |
| 4,122,036 | 10/1978 | Lewis | 201/32 |
| 4,242,102 | 12/1980 | Snell | 48/197 R |

Primary Examiner—Robert L. Lindsay, Jr.
Attorney, Agent, or Firm—Cole, Jensen & Puntigam

[57] ABSTRACT

In the method, organic, i.e. carbon-containing, material, such as straw, wood chips, sawdust, or dead bacterial waste from a sewage treatment plant, is heated in a pyrolytic reactor, thereby driving off volatiles from the organic material, including hydrogen and carbon monoxide gases, water vapor, and tars, while leaving charcoal (char) behind. The volatiles are then passed over a base material, such as hot char, which is at a temperature substantially above the pyrolizing temperature, e.g. 950° C. and above, which causes a chemical reaction of the tars and volatiles, resulting in an output of a gaseous mixture consisting largely of carbon monoxide and hydrogen, characterized by an absence of tars. The apparatus includes a pyrolytic reactor in which an initial charge of charcoal is located. An inlet is provided for introduction of the organic material and an exit is provided for the resulting gases and ash products. The reactor is arranged to permit a continous flow of organic material volatiles, and char through the reactor, resulting in continual replenishment of organic material in the pyrolizing portion of the reactor, and replenishment of the charcoal bed portion by the char produced from the parolysis reaction. The reactor vessel is heated to the correct temperatures by means such as electric heating coils or hot air/flame jackets.

5 Claims, 4 Drawing Figures

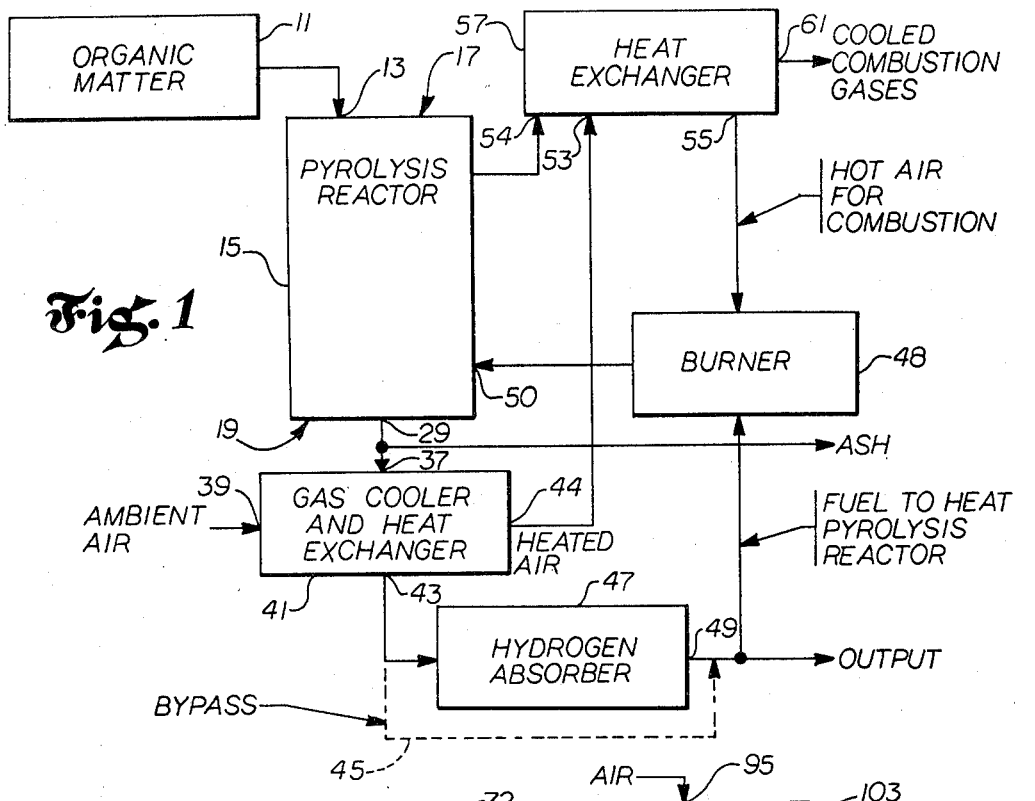
Fig. 1
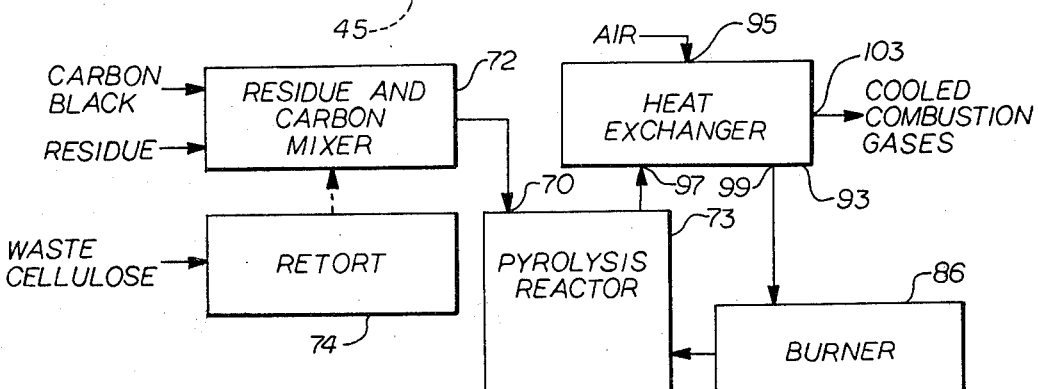
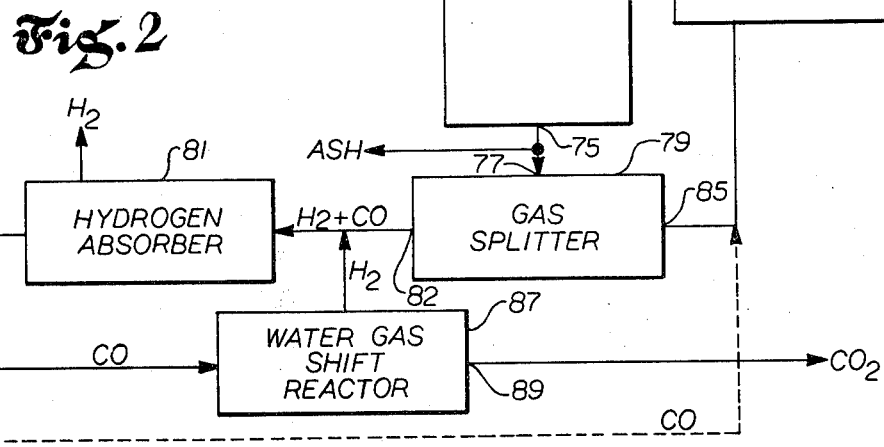
Fig. 2

METHOD FOR CONVERTING ORGANIC MATERIAL INTO FUEL

This is a continuation of application Ser. No. 169,400, filed July 16, 1980 abandoned which in turn is a continuation of Ser. No. 018,118, filed Mar. 7, 1979, now U.S. Pat. No. 4,268,275 granted May 19, 1981.

BACKGROUND OF THE INVENTION

This invention generally relates to the fuel processing art and more specifically concerns a method and apparatus using principles of pyrolysis by which fuel gases without tars are produced from organic materials.

Large amounts of organic material are burned or otherwise disposed of as waste each year. This is particularly true for certain cellulose products such as straw and the slash residue of logging operations. It is typical present practice to burn such material, since it is usually uneconomical to dispose of it in any other way.

There have been previous attempts to beneficially use such material, but these attempts have heretofore been shown to be impractical. In one prior attempt to use such material for a beneficial purpose, carbon monoxide is reacted with organic material at high temperatures and very high pressures to form a liquid fuel similar to crude oil. However, this process is impractical because of the expense of transportation of the organic material, the high cost of the equipment to implement the process, and the follow-on costs necessary to refine the crude oil.

In another known apparatus, referred to generally as a gasogen, a combustible fuel mixture, useful as a fuel for internal combustion engines, is produced by burning organic material in a limited-air environment. In the gasogen, volatile gases, i.e. carbon monoxide and hydrogen, are driven off from the organic material. These gases can be used directly as a motor fuel. However, substantial amounts of tars and other nonusable byproducts are produced when the material is burned. These tars and other byproducts must be filtered from the gases before the gases can be used. In addition, the air used in the combustion process also passes through the carburetor of the engine using the fuel, which has been found to detract considerably from the power output of the apparatus.

A technique known as pyrolysis, which involves the heating of materials in the absence of air to a sufficient degree to result in a chemical reaction which produces carbon monoxide, water vapor and hydrogen volatiles, has also been used to a limited extent in this area. The pyrolysis process, however, also produces undesirable tar byproducts, much the same as the gasogen.

In view of the significant amounts of waste organic material created each year, which must be disposed of in some way, there remains a significant need for a process and apparatus which can economically use such material to produce a useful product.

Accordingly, a general object of the present invention is to provide an apparatus and a method for producing a useful product, such as a fuel, from waste organic material.

It is another object of the present invention to provide such an apparatus and method which does not in addition produce tar or other undesirable byproducts.

It is a further object of the present invention to provide such an apparatus which may be conveniently transported to, and used at, the site of the organic material.

It is yet another object of the present invention to provide such a process which may be implemented on a large scale in a stationary plant.

SUMMARY OF THE INVENTION

The present invention is an apparatus and a method for converting organic material into a gaseous fuel. The apparatus includes a chamber having first and second portions, wherein the first portion is adapted to receive the organic material, and the second portion is adapted to receive a base material, such as charcoal. The apparatus includes means for heating the first portion of the chamber sufficiently that the organic material therein undergoes a pyrolysis reaction, so that pyrolysis volatiles, including hydrogen, carbon monoxide, water vapor and tars, are driven off from the organic material. The apparatus also includes means which maintains a region in the second portion of said chamber at a reaction temperature. The second portion, moreover, is located and arranged relative to the first portion such that the pyrolysis volatiles driven off from the organic material in the first portion of the chamber move through the region in the second chamber which is maintained at the reaction temperature. The reaction temperature is sufficiently high that the tars and water vapor react further to form product gases, essentially hydrogen and carbon monoxide, and an essentially non-tar residue. The hydrogen and carbon monoxide gases created from the pyrolysis reaction and the further reaction of the tars and water vapor exit from the chamber and are characterized by an essential absence of tars.

The process involves the steps of introducing organic material into a chamber which has first and second portions, the first portion of which is adapted to receive the organic material and a second portion which is adapted to receive a base material, such as charcoal. The organic material is then heated to a sufficiently high temperature that it undergoes a pyrolysis reaction, resulting in pyrolysis volatiles, as specified above. A region of the second portion of the chamber is also heated to a reaction temperature. The pyrolysis volatiles are then directed through the reaction temperature region, with the reaction temperature being sufficiently high that the tars and water vapor of the pyrolysis volatiles react further to produce product gases, essentially hydrogen and carbon monoxide, and an essentially non-tar residue. The hydrogen and carbon monoxide gases resulting from the process are then directed out of the chamber, and are characterized by an essential absence of tars.

DESCRIPTION OF THE DRAWINGS

A more thorough understanding of the invention may be obtained by a study of the following detailed description taken in connection with the accompanying drawings in which:

FIG. 1 is a block diagram of one embodiment of the apparatus of the present invention.

FIG. 2 is a block diagram of a second embodiment of the apparatus of the present invention.

DESCRIPTION OF THE PREFERRED EMBODIMENT

FIG. 1 shows a block diagram of one embodiment of the apparatus of the present invention. Waste organic material, in the form of straw, slash, or other wood residue, is initially stored in a reservoir 11. The organic material is directed, by suitable means, such as a conveyor or a vacuum system (not shown) from reservoir 11 into an inlet 13 of the input end 17 of a pyrolysis reactor vessel 15, which is shown in more detail in FIG. 3.

Figure 3:
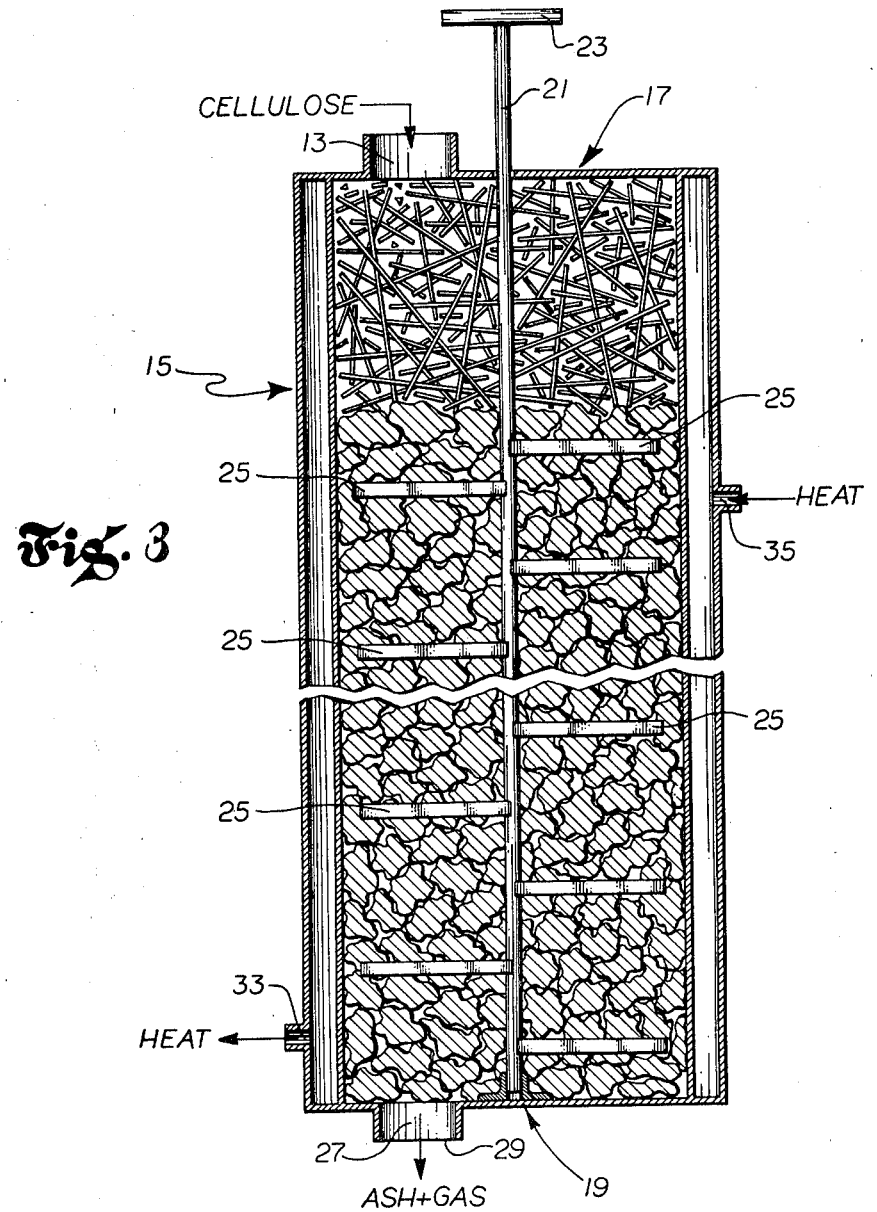
FIG. 3 is a cross-sectional diagram showing in more detail one portion of the apparatus of the embodiments of FIGS. 1 and 2.

The reactor vessel 15 in the embodiment shown in FIG. 3 is an elongated cylindrical tube, approximately 6 inches in diameter and 4 feet long. The reactor vessel 15 comprises an inert oxidation-resistant metal, such as inconel, or a titanium clad steel. In the embodiment shown, the walls of the reactor vessel 15 are 0.060 inches thick, although this dimension is not critical and can be varied substantially.

In the embodiment shown, inlet 13 is an opening having a circular or oval configuration. The diameter of the circular opening is approximately 2 inches, with the dimensions of the oval opening being commensurate. Within the reactor vessel 15 is initially stored a sufficient amount of charcoal to extend from the exit end 19 to within approximately 6 inches of the input end 17. The charcoal is in conventional form, in lumps of varying sizes, loosely packed together. The remainder of the space in the reactor, i.e. the space between the charcoal and the input end 17, is filled by the waste organic material.

Running the length of the reactor vessel 15 and located centrally thereof, is a stirring rod 21. The stirring rod 21 extends upward some distance from the input end of the reactor vessel 15 and terminates in a handle 23, which is used to turn the stirring rod 21. Arranged at points along the length of the stirring rod, within the area of the reactor vessel in which the char is located are a series of paddles or horizontal rods 25. The paddles extend from the central vertical rod a substantial distance toward the wall of the reactor vessel 15.

When the handle 23 is turned, the paddles 25 will agitate the char, thereby loosening the char pack and causing a movement if any ash toward the exit end of the vessel. The agitation of the char will prevent the formation of localized channels in the char through which gases could otherwise pass without substantial contact with the charcoal.

An outlet 27 is provided at the exit end 19 of the reactor vessel 15. Outlet 27 includes a slidable gate 29 which covers the opening. Outlet 27 is for the exit of the fuel gases and the ash residue from the vessel 15. These products are the results of the chemical processes occuring within the chamber, which will be explained in more detail hereinafter. When it is desired to release the ash, gate 29 is moved away from the opening, and the ash can then be conveniently removed. The gases which exit from outlet 27 are directed to follow-on devices which are also more fully explained hereinafter.

Charcoal is initially loaded into the pyrolysis reactor vessel 15, as stated above, and the vessel heated so that the charcoal reaches a reaction temperature. Although charcoal is preferred, it is not critical, as alumina or brick material, or certain ceramics could be used. This material forms a "base" material on which the tars come to rest, after which the tars react further, as explained in more detail hereinafter.

The term reaction temperature refers to that temperature at which the volatile products of the pyrolysis reaction, particularly the tars, undergo a further chemical reaction to the form of combustible gases. For the embodiment shown, this is 950° C. This heating may be accomplished in several ways. Electrical coils may be wrapped around the vessel, or a hot air jacket may be used, as shown in FIG. 3, in which very hot gases, supplied by a combustion unit, such as a burner, are channeled into a confined space surrounding the vessel. Initial fuel for the burner, such as propane, may be supplied from an external source.

After the vessel 15 has been heated sufficiently that the initial charge of charcoal has reached the reaction temperature, organic material is introduced into the vessel at the top region thereof, as shown in FIG. 3. In this first region of the vessel, a conventional pyrolysis reaction occurs. The organic material is heated, usually in the absence of air, to a sufficient temperature, i.e. above 450° C., but usually about 700° for increased reaction speed, that it undergoes a pyrolysis reaction. In the pyrolysis reaction, gases, water vapor and other volatiles, including tars, are driven off from the organic material, leaving behind a char residue, which falls to the top of the charcoal already in the reactor vessel 15. The volatiles driven off, besides the tars, and some water vapor, include carbon monoxide and hydrogen, according to the following formula:

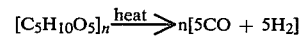

$$[C_5H_{10}O_5]_n \xrightarrow{heat} n[5CO + 5H_2]$$

The volatiles driven off from the organic material during the first step of the process in the first region of the vessel 15, including the carbon monoxide and hydrogen gases, water vapor, and the tars, are then passed through the second region of the vessel 15, which, in the embodiments of FIGS. 1 and 2, is located immediately below the first region and contains the hot char. The char is maintained at the reaction temperature, which for the embodiments shown, is at least 950° C.

The hydrogen and carbon monoxide gases pass through the hot char unaffected. The water vapor is converted by the heat in its passage through the char to a mixture of carbon monoxide and hydrogen according to the following formula:

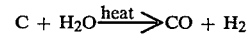

$$C + H_2O \xrightarrow{heat} CO + H_2$$

Most importantly, the volatile tars, in passing through the hot char, decompose to combustible gases, largely carbon monoxide and hydrogen, and additional char. The output of the reactor vessel thus is nearly completely hydrogen and carbon monoxide, with a small amount of additional combustible gases. The char is used within the vessel as part of the process, and there are virtually no tars. The gas products and the char ash exit from the reactor vessel through outlet 27.

Char is, of course, consumed during this process. However, sufficient additional char is supplied continuously as a byproduct of the pyrolysis of the organic material. If sufficient char is not produced with a particular organic material input, other material may be added to the input having a high char residue. If too much char is produced, water may be added until an equilibrium is reached.

Referring now again to FIG. 1, the hydrogen and carbon monoxide gases which exit from outlet 27 of the reactor vessel 15 are delivered by a pipe or similar conventional means to a heat exchanger 41. The ash which is removed from the vessel 15 may be disposed of in any convenient way. For instance, a cyclone separator, or filter, or a gas scrubber may be used at outlet 27 to remove the ash and separate it for disposal.

The heat exchanger 41 is conventional and may be purchased commercially as an off-the-shelf item, and installed in the conventional way. The gases from reactor vessel 15, which are typically at the reaction temperature, e.g. 950° C. and above, are introduced into heat exchanger 41 through one inlet 37, while air at ambient temperature is introduced through another inlet 39.

In the operation of heat exchanger 41, heat energy in the gases introduced at inlet 37 will be transferred to the air introduced at inlet 39. The hot gases from the reaction vessel are thus cooled in the heat exchanger, and are directed out of the heat exchanger 41 through outlet 43, where the gases are at an approximate temperature of 300° C. The air which enters at inlet 39 gains in temperature as it proceeds through the heat exchanger, and exits through outlet 44, where it is at an approximate temperature of 500° C.

An outlet 43, the carbon monoxide and hydrogen gases, which are in the approximate ratio of one to one by volume, are directed either through by-pass line 45 to an end use, such as an engine, or to a hydrogen absorber unit 47. The gas in line 45 may, for instance, be injected directly into the carburetor of a conventional internal combustion engine, without the need for additional filtering or engine modifications, other than fuel-/air ratio adjustments, or it may be used as a fuel gas for residential or industrial use.

Alternatively, it may be desirable in certain applications to provide a storage capacity for the fuel. In such an application, the gases from heat exchanger 41 are directed into a hydrogen absorber unit 47. It is known that certain commercially available metal alloys have a capability of absorbing and storing hydrogen gases. One example is an alloy of iron and titanium. Another example is an alloy of magnesium and nickel. These alloys become hydrides by absorbing hydrogen. Although hydrogen absorber units are relatively well-known, additional explanatory material appears in an article in Science magazine, Volume 193, dated July 23, 1976, at p. 314–317. The article is by J. R. Powell, F. J. Salzano, Wen-Shi Yu, and J. S. Milau and is entitled "A High Efficiency Power Cycle in Which $H_2$ is Compressed by Absorption in Metal Hydrides."

The hydrogen absorber typically might comprise a one cubic foot volume of pea-size particles of the hydride. This amount of material will provide approximately a one-quarter hour reserve for 300 cubic inch engine. The hydride materials will continue to absorb hydrogen at a given pressure until they are saturated. The absorption capacity will increase with increases in pressure up to 500 lbs/sq. in. In operation, as the carbon monoxide and hydrogen gases from heat exchanger 41 are directed through the particles, they will absorb hydrogen, and will give off heat, which is radiated to the atmosphere.

The carbon monoxide, with a given amount of hydrogen which depends on the degree of saturation of the hydrogen absorber, will exit from hydrogen absorber 47 at outlet 49 from where they may be routed directly to an end use, such as an engine. A certain amount, i.e. 25% of the gas present at outlet 49, may be directed to a combustion unit 48 where it is used to produce combustion gases to heat reactor vessel 15 through inlet 50 to the hot air jacket 52.

The heated air at outlet 44 of heat exchanger 41 is directed through a pipe or similar means to another conventional heat exchanger 57, through inlet 53. Hot air gases at high temperature, e.g. 950° C. and above, are taken from the hot air jacket surrounding vessel 15, and introduced to heat exchanger 57 through inlet 54. In conventional operation of the heat exchanger, some of the heat energy in the combustion gases introduced at inlet 54 is transferred to the air introduced at inlet 53.

The cooled combustion gas, at a temperature of approximately 500° C. is then vented to the atmosphere through vent outlet 61. The air at inlet 53, which has now undergone a further increase in temperature in heat exchanger 57, exits from outlet 55 at a temperature of approximately 850° C. The heated air at outlet 55 is then directed through a pipe or similar means to combustion unit 48, where it is used to produce the hot combustion gases directed to the jacket 52.

Another embodiment of the apparatus of the present invention is shown in FIG. 2. This embodiment has many similarities to that of the embodiment of FIG. 1, especially in regard to the structure and operation of the reactor vessel, but is adapted to somewhat different input material than that for the embodiment of FIG. 1.

In the embodiment of FIG. 2, the primary input is intended to be residue from sewage treatment plants, especially the dead bacteria which has consumed the sludge. Such material is not usually sufficiently high in carbon to provide a proper input by itself to the reactor vessel, i.e. to supply the char necessary to keep the process going, so additional material, in the form of carbon black added directly to the residue input, in mixer 72. Additional char material may be added by the operation of a conventional pyrolysis chamber, referred to as retort, which produces char, which may then be added to the mixer 72.

This combined input is introduced to the pyrolysis reactor vessel 73 through inlet 70. The operation of the reactor vessel 73 in FIG. 2 is identical to that of reactor vessel 15 in the embodiment of FIG. 1. A residue of char ash and the product fuel gases are produced at outlet 75. The gases are then directed to the inlet 77 of a gas splitter 79, which is a device for splitting the volume flow of gas into two paths. It may, for instance, be a valve having one inlet and two outlets and an adjustable deflector. The position of the deflector will determine the relative portions of the volume gas present at the inlet which are directed to each outlet.

In the embodiment shown, approximately 75 percent of the gas at the inlet 77 of the gas splitter 79 is directed to hydrogen absorber 81 from outlet 82 of the gas splitter 79, while the remaining portion is directed from outlet 85 back to a combustion unit 86, which produces the hot combustion gases to heat the vessel 73. Alternatively, electrical heating coils may be used. Hydrogen absorber 81 may be identical to that described for the embodiment of FIG. 1 above. The gas output from hydrogen absorber 31 may be used in various applications. In one variation the gas may be used directly as a motor fuel, or in another variation, may be applied to a methanator chamber, which is a conventional, commercially available apparatus, to produce natural gas.

If it is desirable that the product gas be primarily hydrogen, as would be the case for commercial hydrogen applications, a water/gas shift reactor 87 may be used. The water/gas shift reactor is a conventional device and comprises a reaction chamber, referred to as a bottle, which contains water vapor and a catalyst. In operation, the mixture of hydrogen and carbon monoxide gases from hydrogen absorber 81 are passed through the reaction chamber, along with the water vapor. The gases react with the water vapor to produce hydrogen and carbon dioxide ($CO_2$). The carbon dioxide is then absorbed by a suitable absorbing material (not shown) in the reaction chamber, while the remaining hydrogen gas is directed out of the shift reactor at outlet 89.

The carbon dioxide absorbing medium in the reaction chamber may be removed from time to time, and the carbon dioxide, which is industrially marketable, extracted. As a further variation of the structure just described, the carbon monoxide gases from hydrogen absorber 81 may be applied to combustion unit 86 to assist in the heating of the vessel.

The embodiment of FIG. 2 also includes a heat exchanger 93. Air at ambient temperature is introduced into the heat exchanger 93 at inlet 95, while hot air from the jacket surrounding vessel 73 is introduced into the heat exchanger at inlet 97. Heat energy in the gas at inlet 97 is then transferred to the air in the heat exchanger, raising its temperature. This heated air is then directed through outlet 93 back to burner 86 to assist in heating the reactor vessel 73, while the cooled gases from inlet 97 are vented to the atmosphere through vent outlet 103.

Figure 4:
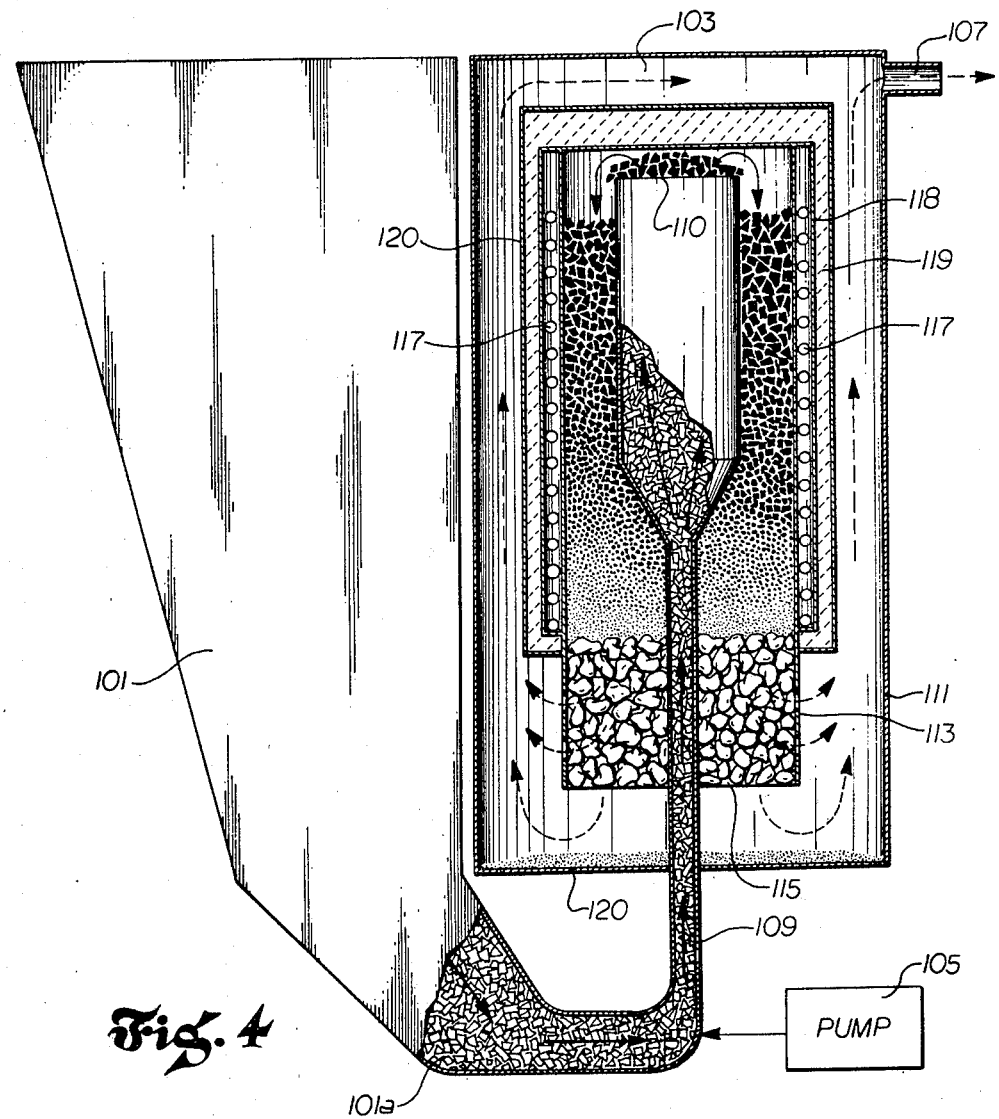
FIG. 4 is a cross-sectional diagram showing a third embodiment of the apparatus of the present invention.

FIG. 4 shows another embodiment of the present invention. It includes generally a storage vessel for the organic material 101 and a reactor vessel 103. The organic material placed in the storage vessel 101 is moved by a pump 105 into the reactor vessel, which produces a mixture of hydrogen and carbon monoxide synthesis gases at outlet 107, similar to that of the embodiments of FIGS. 1 and 2.

Storage vessel 101 is similar to a conventional hopper, and may take various configurations. It may, depending upon the application, be approximately the same size as the reactor vessel, or substantially larger. Into vessel 101 is placed the organic material such as that described above, with the material usually being in a chopped or granulated form.

In operation of the device of FIG. 4, the organic material moves down toward the lower end 101a of storage vessel 101 which forms a funnel, and is from there pumped, by pump 105, up into the reactor vessel 103 through a vertical tube 109. The pump 105, which is shown in schematic form in FIG. 4, may be mechanical, hydraulic or vacuum, of conventional design. Its purpose is to force the organic material into the reactor vessel upwards through vertical tube 109.

The reactor vessel 103 includes an outer wall 111, and an inner chamber in which the two step process of the present invention occurs. The inner chamber comprises a first tubular section 113, the bottom end 115 of which is closed with the exception of an opening, approximately central thereof, through which elongated tube 109 extends. Surrounding tubular section 113 over most of its length is a set of heating coils shown generally at 117, which provide the necessary heat for the vessel.

In the embodiment shown, tubular section 113 is approximately 6 inches in diameter and approximately 30 inches high. Surrounding the coils 117 and across the open top of tubular section 113 is a metal coil wall 118, which in turn is surrounded by a layer of insulation 119, approximately 2 inches thick. Surrounding the insulation layer 119 is an insulation wall 120, so that the insulation layer 119 is contained between two metal walls 118 and 120.

The elongated tube 109, which in the embodiment shown is an ovalized two inch diameter tube, extends up into the interior of tubular section 113 approximately 10-12 inches, at which point its wall diverges outward over a vertical distance of 2-3 inches, until the tube 109 has a diameter of 3 inches, from which point the diameter of the tube remains constant, until it terminates at an open end 110 approximately 2 inches below the lower surface of the top wall of insulation.

The outer wall 111 completely surrounds the inner chamber and is configured to leave a distance of approximately 1½-2 inches between the outer wall 111 and the wall of insulation 119.

The elongated tube 109 may be made out of a mild steel or stainless steel, as may the walls 118 and 120, between which is the insulation layer 119. The insulation layer itself may be a conventional ceramic. The walls of the tubular section 113 may in some instance be a mild steel, although if an oxidation problem occurs, inconel or a comparable metal may be used. The outside wall 111 is also of stainless steel.

In operation, the chopped organic material is pumped through elongated tube 109 into the interior of tubular section 113. There is an initial charge of charcoal in tube 109, which has been previously heated to the reaction temperature. As organic material is pushed upward in section 113, it will become sufficiently heated to pyrolysis. Initially, the pyrolysis will occur relatively high up in tube 109, i.e. inside the tubular section 113, but as the process continues and synthesis gases at high temperatures produce elevated temperatures in the region between wall 111 and tubular section 113, the pyrolysis will begin down further in tube 109, closer to the point where tube 109 goes through wall 111.

As the organic material undergoes the pyrolysis reaction, volatiles, including hydrogen, carbon monoxide, and water vapor, as well as tars, are given off, and char is a byproduct. The char, along with the initial charge of charcoal, is at the reaction temperature, i.e. above 950° C. for the embodiment shown. The volatiles move through the hot char and the further reaction occurs, explained above, in which the water vapor and tars react further to produce combustible gases, primarily hydrogen and carbon monoxide, and further char. The char is gradually pushed up by the action of the pump 105, and is also being gradually consumed so that ash is present in some quantity at the top 110 of tube 109.

The continuous pressure of the pump 105 acts to keep the char and the ash moving upwards, until it spills out over the top lip of the tube 109 and falls into the space between elongated tube 109 and the wall of tubular section 113. Typically, in equilibrium operation, the char and ash will accumulate to within a few inches of the top of the elongated tube. The volatiles move out of the top of tube 109 and then are pressured downward, through the hot char and ash between tube 109 and the wall of tubular section 113. Towards the bottom of tubular section 113, the char has been nearly all consumed, leaving primarily ash.

At the bottom of tubular section 113 is a layer of granulated ceramic material, which forms a filter bed, approximately 5 inches high. The hydrogen and carbon monoxide gases, which are the products of the chemical reaction in the charcoal region, pass through the filter bed, through screened openings on the lower portion of tubular section 113 and into the space between tubular section 113 and outer wall 111. The ash also moves down through the granulated filter bed and settles onto the bottom surface 120 of wall 111 where it collects. This ash can be removed through a convenient opening (not shown).

The synthesis gas then moves upwardly between the insulated wall 119 and exterior wall 111, until it exits from the chamber through exit 107. At exit 107 will typically be located a filter arrangement, such as a mechanical filter or an electrostatic percipitator, to remove any particulates in the gas.

The embodiment of FIG. 4 is particularly useful, especially if substantially increased in size, in the form of a stationary plant, to provide gas for heating and other industrial art residential purposes. The synthesis gas produced by the apparatus of FIG. 4 can be routed to a methanator and from that directly into the gas lines serving industrial and residential natural gas users. Although several uses of the end product, i.e. the synthesis gases, have been described, it should be understood that the use of the product does not restrict the scope of the present invention, as many uses of the synthesis gases exist.

Hence, an apparatus and method have been described which utilize waste organic material in a two-step process to produce a mixture of combustible gases which are suitable for use as a fuel, without the presence of undesirable tars.

An apparatus may be conveniently and economically constructed using the principles of the present invention and transported to the site of organic material, thus making practical use of waste organic material, such as slash, straw, and sawdust. Such an apparatus may be particularly useful in farming operations, such as on a combine, in which large quantities of straw or similar material are typically discarded and burned. Alternatively, large fixed plants may be constructed, and the synthesis gas products used to produce natural gas for industrial and residential uses.

Although an exemplary embodiment of the invention has been disclosed herein for purposes of illustration, it will be understood that various changes, modifications and substitutions may be incorporated in such embodiment without departing from the spirit of the invention, as defined by the claims which follow. For instance, the embodiments of this application have been described with particular dimensions. These dimensions may be changed, even substantially, within the scope of the present invention.

What is claimed is:

1. A process for converting organic material into a high quality fuel gas, wherein the process is carried out in a chamber which includes upper and lower adjacent vertical portions, the process comprising the steps of:
   introducing an initial charge of charcoal, into the lower portion of the chamber;
   heating the charcoal to a reaction temperature;
   introducing organic material into the upper portion of the chamber after the charcoal has been heated to the reaction temperature, such that the lowermost portion of the organic material comes into contact with the uppermost portion of the heated charcoal;
   decomposing the organic material by heating the organic material to a pyrolysis temperature within the range of 450 degrees C. and 750 degrees C., the resulting pyrolysis reaction being characterized by a lack of combustion sufficiently rapid to result in a flame, the products of the pyrolysis reaction consisting of char, and pyrolysis volatiles consisting of hydrogen, carbon monoxide, water vapor and tars;
   decomposing the water vapor and tars to essentially pure hydrogen and essentially pure carbon monoxide by passing the water vapors and tars through the heated charcoal, wherein the reaction temperature of the charcoal is substantially higher than 700 degrees, and wherein the charcoal is arranged and maintained so that substantially all of the pyrolysis volatiles come into contact with the heated charcoal such that the gas exiting from the lower portion of the chamber comprises hydrogen and carbon monoxide with virtually no tars;
   replenishing the organic material as it is consumed;
   replacing the charcoal consumed during the process by the char produced by the pyrolysis reaction of the organic material in the upper portion of the chamber 2. The process of claim 1, wherein said reaction temperature is approximately at least 950° C.

3. The process of claim 1, including the step of maintaining the level of base material in the second portion of the chamber approximately the same during the process.

4. The process of claim 1, wherein the step of decomposing the organic material is carried out substantially in the absence of air.

5. The process of claim 1, wherein the pyrolysis volatiles and the char move substantially vertically from the first portion of the chamber to and through the second portion thereof.

* * * * *